(12) United States Patent
Sadakane et al.

(10) Patent No.: US 9,370,196 B2
(45) Date of Patent: Jun. 21, 2016

(54) PALM-BASED FRACTIONATED OIL AND FAT, OIL AND FAT COMPOSITION AND FOOD PRODUCT CONTAINING THE SAME

(71) Applicant: J-OIL MILLS, INC., Tokyo (JP)

(72) Inventors: Tadayoshi Sadakane, Tokyo (JP); Yusuke Hara, Tokyo (JP); Hiroshi Ito, Tokyo (JP); Hiroshi Muramatsu, Tokyo (JP); Takashi Yamaguchi, Tokyo (JP)

(73) Assignee: J-Oil Mills, Inc., Tokyo (JP)

( * ) Notice: Subject to any disclaimer, the term of this patent is extended or adjusted under 35 U.S.C. 154(b) by 127 days.

(21) Appl. No.: 14/031,535

(22) Filed: Sep. 19, 2013

(65) Prior Publication Data
US 2014/0023773 A1    Jan. 23, 2014

Related U.S. Application Data

(63) Continuation of application No. PCT/JP2012/052314, filed on Feb. 1, 2012.

(30) Foreign Application Priority Data

Apr. 14, 2011    (JP) .................................. 2011-090179

(51) Int. Cl.
*A23D 9/00* (2006.01)
*C11B 7/00* (2006.01)

(52) U.S. Cl.
CPC ... *A23D 9/00* (2013.01); *C11B 7/00* (2013.01); *C11B 7/0016* (2013.01); *C11B 7/0075* (2013.01)

(58) Field of Classification Search
CPC .......... A23D 9/00; C11B 7/0075; C11B 7/00; C11B 7/0016

USPC ......................................................... 426/603
See application file for complete search history.

(56) References Cited

U.S. PATENT DOCUMENTS 4,292,338 A * 9/1981 Ainger et al. ................. 426/603

FOREIGN PATENT DOCUMENTS

| JP | H11155483  | 6/1999 |
| JP | 2006025671 | 2/2006 |

(Continued)

OTHER PUBLICATIONS

Machine translation of JP 2006-025671, publication date Feb. 2, 2006. pp. 1-30.*

(Continued)

*Primary Examiner* — Jenna A Watts
(74) *Attorney, Agent, or Firm* — Edell, Shapiro & Finnan, LLC

(57) ABSTRACT

An oil and fat composition is provided having superior operability and processability, in terms of a liquefying phenomenon of sugar, tackiness and texture of fried doughnuts, filling condition and hardness of shortening, and solidifying time of coating chocolate, by the superior crystallization-promoting effect. A palm-based fractionated oil and fat has 70-90% by weight of the tripalmitin content to triglyceride and 1-8% by weight of the unsaturated fatty acid content to total fatty acid. The oil and fat comprises a hard part obtained by, for example, performing a crystallization operation of palm super stearin with iodine value 10-17 so that the slurry SFC is 20% or less, and fractionating the slurry so that the hard part yield is 26% by weight or less. The fractionation is preferably performed so that a numerical value of the hard part yield/the slurry SFC is 10 or less.

1 Claim, 1 Drawing Sheet

(56) References Cited

FOREIGN PATENT DOCUMENTS

| | | |
|---|---|---|
| JP | 2011022310 | 2/2010 |
| JP | 2011225778 | 11/2011 |
| JP | 2012065657 | 4/2012 |
| WO | 2011132734 | 10/2011 |

OTHER PUBLICATIONS

"Palm Oil, Your vegetable oil for better health." Retrieved online from American Palm Oil Council, available online as of 2003-2004. pp. 1-4.*

"Lipids and Fats". Retrieved online from food.oregonstate.edu, available online as of Apr. 16, 2010. pp. 1-6.*

Man, et al. "Composition and Thermal Profile of Crude Palm Oil and its Products". JAOCS, vol. 76, No. 2 (1999). pp. 1-6.*

International Search Report, Apr. 24, 2012, 3 pages.

Calliauw et al., "On the fractional crystallization of palm olein: Solid solutions and eutectic solidification", Food Research International, vol. 43, Issue 4, May 2010, pp. 972-981.

Basso et al., "Tripalmitin and monoacylglycerols as modifiers in the crystallisation of palm oil", Food Chemistry, vol. 122, Issue 4, Oct. 15, 2010, pp. 1185-1192.

Mihara et al., Effect of Crystallization Temperature of Palm Oil on Its Crystallization. IV. The Influence of Tripalmitoylglycerol (PPP) on the Crystallization of 1,3-dipalmitoyl-2-oleoyl-glycerol (POP) and 1,2-dioleoyl-3-palmitoyl-glycerol (POO), Journal of Oleo Science, vol. 56, No. 5, 2007, pp. 223-230.

Gunstone F.D. et al., Vegetable Oils in Food Technology: Composition, Properties and Uses, Blackwell Publishing, 2002, pp. 59-97.

* cited by examiner

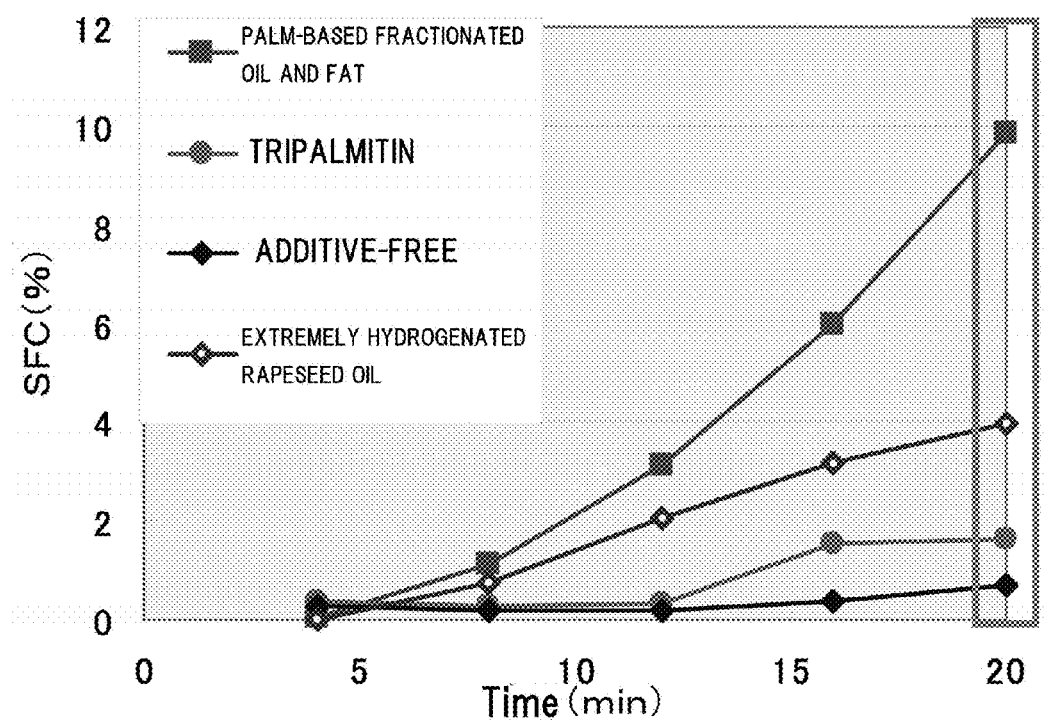

PALM-BASED FRACTIONATED OIL AND FAT, OIL AND FAT COMPOSITION AND FOOD PRODUCT CONTAINING THE SAME

TECHNICAL FIELD

The present invention relates to a palm based fractionated oil and fat, and an application thereof. More particularly, the present invention relates to a palm based fractionated oil and fat with crystallization-promoting effect, and an application thereof.

BACKGROUND

Recently, an oil and fat with low or no trans-fatty acid is often used for food manufacturing. Such an oil and fat tends to have slow crystallization behavior. As a result, problems arise that operability of the oil and fat in the food manufacturing gets worse, and that quality of products also deteriorates.

On the other hand, an oil and fat having crystallization-promoting effect is used to improve operability and quality of an oil and fat composition including frying oil, margarine, shortening, oil and fat for stew, oil and fat for curry and oil and fat for chocolate. For example, in the case of frying oil for doughnuts or the like, crystallization of a blended oil and fat is important for mending a liquefying phenomenon of sugar and tackiness of fried doughnuts. For improving filling condition at the time of shortening/margarine manufacture, the crystallization-promoting effect of a blended oil and fat is effective. In a manufacturing process of roux for stew or curry, there are steps of pouring melted roux into a container, and solidifying while cooling. If crystallization of an oil and fat for stew or curry is fast, the processing time can be reduced. In the case of coating chocolate, if melted chocolate does not solidify well, it takes time to solidify or operability gets worse, such as needing enhancement of cooling. Shorter solidifying time is better, but, if viscosity increases from the start, operability decreases. Accordingly, control of crystallization of a blended oil and fat is important for improving the operability of the coating chocolate.

For promoting crystallization of an oil and fat, conventionally, an emulsifier or the like, as described in comparative examples of the present specification, is blended in the oil and fat. However, when the emulsifier is added to an oil and fat composition for fried food, the crystallization-promoting effect may be extremely reduced by heating.

Japanese Unexamined Patent Application Publication No. 11-155483 discloses an oil and fat composition for fried food characterized by containing a transesterified oil and fat obtained by transesterification reaction of 99-85% by weight of a palm-based oil and fat and 1-15% by weight of an extremely hardened high erucic rapeseed oil. This oil and fat composition for fried food can especially prevent a liquefying-phenomenon of sugar of doughnuts.

Japanese Unexamined Patent Application Publication No. 2006-25671 a roll-in oil and fat composition with each value of PMP+MPM+PPP content, PPP content, PPM/(PMP+MPM), (MPM+PPP)/PMP and PPP/SSS in an oil phase meeting specified conditions (S: Saturated fatty acid having 16-18 carbon atoms M: C is monoene unsaturated fatty acid having 16-18 carbon atoms P: Saturated fatty acid having 16 carbon atoms). According to this invention, operability in paste preparation is improved.

Japanese Unexamined Patent Application Publication No. 2010-22310 discloses tempered chocolates containing 2-19 mass % oil and fat composition with 65 mass % or more content of 1,3-dipalmitoyl-2-oleoyl glycerine (POP) and 0.90 or more mass ratio of the POP to oleoyldipalmitin (P2O) (POP/P2O), and 29-38 mass % an oil component characterized by containing polyglycerol-condensed ricinoleic acid ester. The chocolates are suitable for coating or enrober (topping) application.

SUMMARY

An object of the present invention is to provide an oil and fat having crystallization-promoting effect. Another object of the present invention is to provide an oil and fat composition having superior crystallization-promoting effect by blending the oil and fat. For example, the oil and fat composition, in the case of frying oil, resolves a liquefying phenomenon of sugar and tackiness of fried doughnuts, in the case of shortening, improves filling condition and hardness, and in the case of coating chocolate, improves operability and processability such as solidifying time and drip length. The present invention is also directed to provide a food product using the oil and fat composition.

The present invention provides a palm-based fractionated oil and fat in which the tripalmitin content to triglyceride (tripalmitin weight/triglyceride weight*100 (% by weight)) is 70-90% by weight and the unsaturated fatty acid content to total fatty acid (unsaturated fatty acid weight/total fatty acid weight*100 (% by weight)) is 1-8% by weight.

The tripalmitin content to tri-saturated fatty acid triglyceride (tripalmitin weight/tri-saturated fatty acid triglyceride weight*100 (% by weight)) of the palm-based fractionated oil and fat is preferably 84-95% by weight.

The triglyceride containing unsaturated fatty acid content to triglyceride (triglyceride containing unsaturated fatty acid weight/triglyceride weight*100 (% by weight)) of the palm-based fractionated oil and fat is preferably 0.5-18% by weight.

The palm-based fractionated oil and fat comprises a hard part obtained by, for example, performing a crystallization operation of a palm fractionated hard part as raw material and fractionating the slurry so that the hard part yield is 26% by weight or less. The hard part yield refers to hard part weight/(hard part weight+liquid part weight)*100 (% by weight).

The palm fractionated hard part is preferably palm super stearin with iodine value 10-17.

The crystallization operation of the fractionation is preferably performed so that the slurry SFC is 20% by weight or less. The slurry SFC refers to solid fat content in a slurry oil and fat before filtration, after crystallization (solid fat weight/slurry oil and fat weight*100 (% by weight)).

The fractionation is preferably performed so that a numerical value of the hard part yield/the slurry SFC is 10 or less.

The present invention also provides an oil and fat composition comprising:
(I) the palm-based fractionated oil and fat; and
(II) a base oil component consisting of an oil and fat with a melting point of 10° C. or more,
wherein the (I) component content to the oil and fat composition is 0.2-15% by weight and the (II) component content to the oil and fat composition is 85-99.8% by weight.

The (II) component is preferably at least one selected from the group consisting of palm oil and/or fractionated palm oil with iodine value 30-65, random transesterified oil of palm-based oil and fat and lauric-based oil and fat and/or hardened oil thereof, oil which is liquid at normal temperature, palm kernel oil and fractionated palm kernel oil, and hydrogenated oil of palm kernel oil and fractionated palm kernel oil.

The (II) component preferably contains, with respect to the (II) component, 40% by weight or more of the palm oil and/or the fractionated palm oil with iodine value 30-65.

Also, the (II) component preferably contains, with respect to the (II) component, 50-90% by weight of the palm oil and/or the fractionated palm oil with iodine value 30-65, and 10-50% by weight of the oil which is liquid at normal temperature.

Also, the (II) component preferably contains, with respect to the (II) component, 20-70% by weight of the palm oil and/or the fractionated palm oil with iodine value 30-65, and 10-60% by weight of the random transesterified oil of palm-based oil and fat and lauric-based oil and fat and/or the hydrogenated oil thereof.

Also, the (II) component preferably contains, with respect to the (II) component, 20-70% by weight of the palm oil and/or the fractionated palm oil with iodine value 30-65, 10-60% by weight of the oil obtained by random transesterification of palm-based oil and fat and lauric-based oil and fat and/or the hardened oil thereof, and 10-40% by weight of the oil which is liquid at normal temperature.

Also, the (II) component preferably contains, with respect to the (II) component, 30-80% by weight of extremely hydrogenated palm kernel oil, and 20-70% by weight of palm kernel olein.

The oil and fat composition of the present invention is suitable for, in particular, an addition ingredient of frying oil, shortening, margarine, spread, chocolate, or roux for stew or the like.

The present invention also provides a food product comprising 5-100% by weight of the oil and fat composition with respect to the composition.

The food product of the present invention is suitable for in particular frying oil, shortening, margarine, spread, chocolate, roux for stew or the like, etc.

The palm-based fractionated oil and fat of the present invention has superior crystallization-promoting effect. For that reason, the oil and fat composition containing the palm-based fractionated oil and fat of the present invention is available for various applications. It is important whether frying oil for doughnuts is crystallized or not, in terms of a liquefying phenomenon of sugar, tackiness and texture of fried doughnuts. The oil and fat composition of the present invention can deal with such problems.

Conventionally, for an oil and fat composition for fried food with the addition of an emulsifier which is known to promote crystallization, crystallization-promoting effect is extremely reduced when heated. In contrast, when the oil and fat composition of the present invention is heated approximately to frying condition, the promoted crystallization is not reduced.

The oil and fat composition of the present invention improves filling condition at the time of shortening/margarine manufacture by crystallization-promoting effect. Also, if the degree of crystallization is high from an early stage, an effect of mixing and kneading is intensified and the quality is further improved in terms of homogenization.

In the case of coating chocolate, if solidifying is not well, it takes time to dry and cooling must be enhanced. Shorter solidifying time is better, but, if viscosity increases from the start, operability decreases. Adding the oil and fat composition of the present invention to base paste for coating chocolate can provide better solidifying and improve the operation efficiency. Also, with paste for soft chocolate, operations are enabled.

BRIEF DESCRIPTION OF THE DRAWINGS

FIG. 1 shows behavior of Solid Fat Contents (SFC) of 25° C.*0-20 minutes after of the oil and fat composition (Example 12) which contains 1% by weight of the palm-based fractionated oil and fat prepared according to Example 1 of the present invention. For comparative purposes, FIG. 1 shows SFC of oil and fat compositions which are, instead of the palm-based fractionated oil and fat, additive-free (Comparative Example 6), with the addition of 1% by weight of extremely hardened rapeseed oil (Comparative Example 7) and with the addition of 1% by weight of tripalmitin (Comparative Example 10). FIG. 1 indicates that, though initial SFC of the oil and fat composition with the addition of the palm-based fractionated oil and fat of the present invention is the same as others, after a certain period of time, it increases more intensively than the others.

DETAILED DESCRIPTION

Hereinafter, embodiments of the palm-based fractionated oil and fat of the present invention (hereinafter, will be referred to as "the oil and fat of the present invention"), the oil and fat composition containing the same and the food product using the oil and fat composition will be described in detail.

The oil and fat of the present invention can be obtained from a palm-based oil and fat, which is a raw material. Examples of the raw material oil and fat include palm oil and fractionated palm oil, such as palm stearin and palm super stearin, obtained by fractionating the palm oil. The preferred raw material oil and fat is palm super stearin with iodine value 10-17.

The oil and fat of the present invention is further defined by a certain range of the tripalmitin content and of the unsaturated fatty acid content. The tripalmitin content (hereinafter, also referred to as "PPP content") is expressed by tripalmitin weight/triglyceride weight*100 (% by weight). Triglyceride in the oil and fat may be analyzed in accordance with A.O.C.S. Official Method Ce 5-86. In the present invention, the tripalmitin content is 70-90% by weight, preferably 78-90% by weight. If PPP content is less than 70% by weight, an effect of promoting crystallization may be reduced, conversely, it is difficult to industrially obtain beyond 90% by weight of the palm-based fractionated oil and fat by fractionating.

The unsaturated fatty acid contained in the palm-based fractionated oil and fat comprises oleic acid (18:1), linoleic acid (18:2) and linolenic acid (18:3). The constituent fatty acid including these acids may be analyzed in accordance with AOCS Official Method Ce 1 h-05 (2005). The unsaturated fatty acid content is expressed by unsaturated fatty acid weight/total fatty acid weight*100 (% by weight). In the present invention, the unsaturated fatty acid content is 1-8% by weight, preferably 1-6% by weight. If the unsaturated fatty acid content is less than 1% by weight, it is difficult to obtain the palm-based fractionated oil and fat by industrially fractionating. If the unsaturated fatty acid content is beyond 8% by weight, the effect of promoting crystallization may be reduced.

Also, the tripalmitin content to tri-saturated fatty acid triglyceride (tripalmitin weight/tri-saturated fatty acid triglyceride weight*100 (% by weight)) is preferably 84-95% by weight, more preferably 85-95% by weight, still more preferably 86-95% by weight, particularly preferably 86-92% by weight. In tri-saturated fatty acid triglyceride, all of three fatty acid components bonded with triglyceride are saturated fatty acids. If the above-mentioned content is less than 84% by weight, the effect of promoting crystallization may be reduced. Conversely, if the above-mentioned content is beyond 95% by weight, it is difficult to obtain the palm-based fractionated oil and fat by industrially fractionating.

Also, the triglyceride containing unsaturated fatty acid content of the palm-based fractionated oil and fat is expressed by triglyceride containing unsaturated fatty acid weight/triglyceride weight*100 (% by weight). The lower limit of this content is, in terms of productivity, preferably 0.5% by weight, more preferably 1% by weight, particularly preferably 4% by weight. The upper limit of this content is, in terms of effect of promoting crystallization, preferably 18% by weight, more preferably 16% by weight. If the above-mentioned content is less than 0.5% by weight, the yield of the target palm-based fractionated oil and fat may decrease, so that operation becomes inefficient. Conversely, if the abovementioned content is beyond 18% by weight, the effect of promoting crystallization may be reduced.

The components other than tripalmitin and unsaturated fatty acids contained in the oil and fat of the present invention depend on the raw material oil and fat. The compositions before and after the fractionation, in case that the raw material is palm super stearin, are shown in Table 1.

TABLE 1

| Composition | Palm super stearin (% by weight) | Palm-based fractionated oil and fat (% by weight) |
|---|---|---|
| C12:0 | 0-0.2 | 0-0.1 |
| C14:0 | 0.9-1.4 | 0.5-1.0 |
| C16:0 | 75.0-84.0 | 84.0-94.0 |
| C18:0 | 4.0-5.0 | 3.0-4.5 |
| C18:1 | 7.5-15.0 | 1.0-7.5 |
| C18:2 | 1.2-3.0 | 0.1-1.5 |
| C18:3 | 0-0.2 | 0.0-0.1 |
| C20:0 | 0.2-0.4 | 0.1-0.4 |
| Saturated fatty acid content | 82-92 | 92-99 |
| Unsaturated fatty acid content | 8-18 | 1-8 |

The oil and fat of the present invention is obtained, for example, by the following manufacturing method. At first, after melting palm super stearin with iodine value 10-17 as the raw material at a temperature above the melting temperature, the resultant oil is crystallized while gradually cooling such that SFC of slurry is 20% by weight or less, preferably 0.2-18% by weight, more preferably 0.2-10% by weight, still more preferably 0.2-5% by weight, most preferably 0.2-2% by weight. If the slurry SFC is beyond 20% by weight, the effect of promoting crystallization may be reduced. The resultant slurry is fractionated so that the hard part yield is 26% by weight or less, preferably 0.3-25% by weight, more preferably 1.0-15% by weight. For the fractionation, pressure filtration, such as filter press and belting press, is performed. At this stage, if the hard part yield is beyond 26% by weight, the effect of promoting crystallization may be reduced.

When being fractionated as above, a numerical value of the hard part yield/the slurry SFC is controlled to preferably 10 or less, more preferably 1.0-8.0, particularly preferably 1.2-7.0. By controlling the numerical value of the hard part yield/the slurry SFC to 10 or less, the palm-based fractionated oil and fat having stably high crystallization-promoting effect can be obtained.

The method of the fractionation may be any of known drying fractionations, solvent fractionations. The solvent includes acetone, n-hexane or the like.

When 1% by weight of the oil and fat of the present invention is added to palm oil, SFC of 25° C.*20 minutes is usually 4.0-12.0, preferably 5.3-12.0. The SFC can be obtained by the following method. After completely melting the oil and fat composition at 80° C., the resultant oil and fat composition is put in a glass vessel. Then, after melting completely at 100° C., the resultant composition is placed in a constant temperature water bath at 60° C. for 60 minutes. Furthermore, after placing in a constant temperature water bath at 25° C. for 20 minutes, the amount of precipitated crystal is measured by NMR analyzer.

The present invention also provides an oil and fat composition comprising (I) the palm-based fractionated oil and fat of the present invention and (II) a base oil component.

As the (I) component, the oil and fat of the present invention may be used alone, or blended oil with two or more of oil and fat may be used.

The (I) component content to the oil and fat composition is 0.2-15% by weight, preferably 0.4-12% by weight. If the proportion of the (I) component is less than 0.2% by weight, the effect of promoting crystallization may be reduced, conversely, if the proportion is beyond 15% by weight, the oil and fat may be poor in melt-in-the-mouth feeling.

The base oil as the (II) component is determined depending on the application of the oil and fat composition. For example, when the application of the oil and fat composition is frying oil for frozen foods, the (II) component contains an oil and fat with a melting point of 10° C. or more, preferably of 15-40° C. If the melting point is less than 10° C., sometimes, the crystallization is not performed, or is significantly delayed.

Examples of the oil and fat with a melting point of 10° C. or more include palm oil, coconut oil, palm kernel oil, sal fat, cacao butter, shea butter, fractionated oil and hardened oil of them, and beef tallow, lard, milk fat, fish oil, hardened oil of them, and hydrogenated oil of soybean oil, rapeseed oil, rice oil, corn oil, cotton seed oil, safflower oil, sunflower oil, olive oil, sesame oil or transesterified oil of them.

The (II) component may be at least one selected from the group consisting of palm oil and/or fractionated palm oil with iodine value (also referred to as "IV") 30-65, in particular palm oil and/or fractionated palm oil with IV 30-60, random transesterified oil of palm-based oil and fat and lauric-based oil and fat and/or hydrogenated oil thereof, oil which is liquid at normal temperature, palm kernel oil and fractionated palm kernel oil, and hydrogenated oil of palm kernel oil and fractionated palm kernel oil.

The palm-based oil and fat includes palm oil, fractionated oil of palm oil, transesterified oil, hydrogenated oil, oil and fat obtained by processing palm oil in two or more steps which are selected from fractionation, transesterification and hydrogenation, and the like. The fractionated palm oil includes palm olein, palm super olein, palm stearin and the like.

Preferred examples of the transesterified oil are palm-based oil and fat, random transesterified oil and fat of palm-based oil and fat and lauric-based oil and fat and/or hydrogenated oil thereof. The lauric-based oil and fat refers to an oil and fat, such as palm kernel oil and coconut oil, containing lauric acid with 12 carbon atoms as main constituent fatty acid. The oil and fat obtained by transesterification of palm-based oil and fat and lauric-based oil and fat at a weight ratio of preferably from 20:80 to 70:30, particularly preferably from 30:70 to 60:40, may be used. The transesterification reaction may be any of methods using lipase as catalyst or methods using metal catalysts such as the sodium methylate.

Preferred examples of the hydrogenated oil include extremely hydrogenated palm oil, extremely hardened palm kernel oil and the like. The hydrogenation reaction for the hydrogenated oil may be performed at any stage of before or after the transesterification.

Examples of the oil which is liquid at normal temperature include soybean oil, rapeseed oil, rice oil, corn oil, cotton seed oil, safflower oil, sunflower oil, olive oil, sesame oil, palm super olein (IV 65 or more) and the like. The oil may be used alone or by mixing two or more of them. Preferably, soybean oil, rapeseed oil, corn oil, cotton seed oil, safflower oil or palm super olein (IV 65 or more) is used.

The proportion of the palm oil and/or the fractionated palm oil with IV 30-65 is, with respect to the (II) component, usually 40% by weight or more, preferably 50-100% by weight.

The proportion of the random transesterified oil of palm-based oil and fat and lauric-based oil and fat and/or the hydrogenated oil thereof is, with respect to the (II) component, usually 10-80% by weight, preferably 10-60% by weight, more preferably 10-40% by weight.

The proportion of the oil which is liquid at normal temperature is, with respect to the (II) component, usually 0-40% by weight, preferably 10-40% by weight, more preferably 10-30% by weight.

When (II) component is blended oil containing the palm oil and/or the fractionated palm oil with iodine value 30-65 and the oil which is liquid at normal temperature, the (II) component preferably contains, with respect to the (II) component, usually 50-90% by weight, preferably 60-90% by weight, of the palm oil and/or the fractionated palm oil with iodine value 30-65, and usually 10-50% by weight, preferably 10-40% by weight, of the oil which is liquid at normal temperature.

When the (II) component is blended oil containing the palm oil and/or the fractionated palm oil with iodine value 30-65, and the random transesterified oil of palm-based oil and fat and lauric-based oil and fat and/or the hydrogenated oil thereof, the (II) component preferably contains, with respect to the (II) component, usually 20-70% by weight, preferably 30-70% by weight, of the palm oil and/or the fractionated palm oil with iodine value 30-65, and usually 10-60% by weight, preferably 10-40% by weight, of the random transesterified oil of palm-based oil and fat and lauric-based oil and fat and/or the hydrogenated oil thereof.

When the (II) component is blended oil containing the palm oil and/or the fractionated palm oil with iodine value 30-65, the random transesterified oil of palm-based oil and fat and lauric-based oil and fat, and the oil which is liquid at normal temperature, the (II) component contains, with respect to the (II) component, usually 20-70% by weight, preferably 30-70% by weight, of the palm oil and/or the fractionated palm oil with iodine value 30-65, usually 10-60% by weight, preferably 10-40% by weight, of the oil obtained by random transesterification of palm-based oil and fat and lauric-based oil and fat and/or the hardened oil thereof, and usually 10-40% by weight, preferably 10-40% by weight, of the oil which is liquid at normal temperature.

When the (II) component is blended oil of the extremely hydrogenated palm kernel oil and palm kernel olein, the (II) component contains, with respect to the (II) component, usually 30-80% by weight, preferably 30-60% by weight, of the extremely hydrogenated palm kernel oil, and usually 20-70% by weight, preferably 40-70% by weight, of the palm kernel olein.

Besides the (I) and (II) components, additives known in the art may be added as the (III) component to the oil and fat composition of the present invention within the range not hindering the effect of the present invention. Examples of (III) component include other edible oil and fat; emulsifier such as lecithin, fatty acid ester of glycerin, sorbitan fatty acid ester, propylene glycol fatty acid ester, sucrose fatty acid ester and polyglycerol fatty acid ester; antioxidant such as tocopherol and vitamin C palmitate; thickener or stabilizer such as pectin, carrageenan, xanthan gum, carboxymethyl cellulose (CMC), guar gum, arabic gum, locust bean gum, karaya gum, tamarind gum, tare gum, furcellaran, casein soda, alginate, agar, gum elemi, gum Canada and gum dammar; coloring agent; flavor such as milk flavor, vanilla flavor and vanilla essence; saccharide such as glucose, maltose, sucrose, lactose, trehalose, maltotriose, palatinose, reduced palatinose, xylitol, erythritol, maltitol, sorbitol, isomerized liquid sugar and starch syrup; salt; or dairy products, milk fat or preparation of milk fat such as whole milk powder, buttermilk, fermented milk, skim milk powder, all fat condensed milk, non-fat condensed milk and fresh cream.

The oil and fat composition of the present invention is obtained by mixing the (I) component, the (II) component and the appropriate (III) component in predetermined proportion. The components may be mixed at the same time, or after mixing the (I) component with a part of the (II) component, the resultant composition may be mixed with a residue component.

Based on characteristics of the crystallization-promoting effect, applications of the oil and fat composition of the present invention to various oil and fat compositions, such as frying oil and fat compositions for frying doughnuts, churros, snack, instant noodles or daily dish, oil and fat compositions for margarine or shortening, oil and fat compositions for stew or curry, and oil and fat compositions for chocolate, are expected.

The present invention provides a food product using the above-described oil and fat composition. Examples of the food product include doughnuts, churros, snack, instant noodles, daily dish, margarine, shortening, roux for stew or curry, chocolate and chocolate-coated or chocolate-applied confectionery.

EXAMPLES

Hereinafter, the present invention will be described in more detail by describing examples of the present invention and comparative examples. However, the present invention is not limited by the following examples.

Examples 1-10 and Comparative Examples 1-3

In Examples 1-11 described below, the oil and fat of the present invention was prepared and the physical properties thereof were measured.

Example 1

1. Preparation of the Palm-Based Fractionated Oil and Fat

Using a fractionation pilot plant, De Smet (Laboratory scale pilot fractionation (10 kg batch)), the raw material described below was fractionated. As a raw material, palm super stearin with IV 12 (manufactured by MEWAHOLEO INDUSTRIES SDN. BHD.) was completely melted at 70° C., and then water temperature was gradually cooled to 60° C. After sampling, 2 mL of slurry during crystallization was put in a glass vessel, and the slurry SFC was measured using NMR analyzer (NMS120 minispec, BRUKER Corp.). When the slurry SFC became 0.7%, the slurry was transported to a laboratory filter. By filtering the slurry at a pressure up to 15 bar, hard part was obtained. (The resultant hard part was categorized into the palm-based fractionated oil and fat of the present invention.) The hard part yield calculated by hard part weight/(hard part weight+liquid part weight) was 2.5% by weight (Table 2). The fractionation efficiency calculated by the hard part yield/the slurry SFC was 3.5 (Table 2).

2. Component Analysis of the Hard Part

Component analysis of triglyceride in the hard part was performed, in accordance with A.O.C.S. Official Method Ce 5-86, by the following method. At first, 10 mg sample of the hard part obtained by the above mentioned method was put in a vial. After adding 1 mL of hexane, the sample was completely dissolved. The resultant sample was subjected to gas chromatography (GC) analysis under measurement condition described below.

GC Measurement Condition:
GC/FID (flame ionization detector); HP6890 (AgilentTechnologies, Inc)
Column; CP-TAP CB for Triglycerides
  25 m*0.25 mm, df=0.1
Heating condition; 200° C. (1 min)→(5° C./min)→35° C. (10 min)
Inlet temperature; 350° C.
Detector temperature; 365° C.
Carrier gas; He gas
Carrier gas flow rate; 1.7 mL/min
Makeup gas flow rate; 40 mL/min
Hydrogen gas flow rate; 30 mL/min
Air flow rate; 400 mL/min
Split ratio; 1:50
Injection volume; 1 μl Also, the unsaturated fatty acid content as constituent fatty acid (18:1+18:2+18:3) was measured in accordance with AOCS Official Method Ce 1 h-05 (2005). As a result of GC analysis, the tripalmitin content calculated by tripalmitin/triglyceride was 84.6% by weight (Table 2). Also, the unsaturated fatty acid content calculated by unsaturated fatty acid (18:1+18:2+18:3)/total fatty acid was 2.7% by weight (Table 2). Also, the triglyceride containing unsaturated fatty acid content calculated by triglyceride containing unsaturated fatty acid/triglyceride was 4.4% by weight (Table 2). The tripalmitin content to tri-saturated fatty acid triglyceride was 88.5% by weight (Table 2).

Example 2

The palm super stearin with IV 12 (manufactured by MEWAHOLEO INDUSTRIES SDN. BHD.) was completely melted at 70° C., and then water temperature was gradually cooled to 58° C. When the slurry SFC became 2.0%, the slurry was transported to the laboratory filter, and was filtered. By pressurizing up to 10 bar, hard part was obtained. The resultant hard part was categorized into the palm-based fractionated oil and fat of the present invention. Similarly to Example 1, the hard part yield, the fractionation efficiency and composition of the hard part (the tripalmitin content, the unsaturated fatty acid content, the triglyceride containing unsaturated fatty acid content, and the tripalmitin content to tri-saturated fatty acid triglyceride) were measured. The results are shown in Table 2.

Example 3

The palm super stearin with IV 15 (manufactured by MEWAHOLEO INDUSTRIES SDN. BHD.) was completely melted at 70° C., and then water temperature was gradually cooled to 58° C. When the slurry SFC became 1.7%, the slurry was transported to the laboratory filter, and was filtered. By pressurizing up to 10 bar, hard part shown in Table 2 was obtained. The resultant hard part was categorized into the palm-based fractionated oil and fat of the present invention. Similarly to Example 1, the hard part yield, the fractionation efficiency and composition of the hard part were measured. The results are shown in Table 2.

Example 4

The palm super stearin with IV 15 (manufactured by MEWAHOLEO INDUSTRIES SDN. BHD.) was completely melted at 70° C., and then water temperature was gradually cooled to 59° C. When the slurry SFC became 0.2%, the slurry was transported to the laboratory filter, and was filtered. By pressurizing up to 10 bar, hard part shown in Table 2 was obtained. The resultant hard part was categorized into the palm-based fractionated oil and fat of the present invention. Similarly to Example 1, the hard part yield, the fractionation efficiency and composition of the hard part were measured. The results are shown in Table 2.

Example 5

The palm super stearin with IV 12 (manufactured by MEWAHOLEO INDUSTRIES SDN. BHD.) was completely melted at 70° C., and then water temperature was gradually cooled to 60° C. When the slurry SFC became 0.4%, the slurry was transported to the laboratory filter, and was filtered. By pressurizing up to 15 bar, hard part shown in Table 2 was obtained. The resultant hard part was categorized into the palm-based fractionated oil and fat of the present invention. Similarly to Example 1, the hard part yield, the fractionation efficiency and composition of the hard part were measured. The results are shown in Table 2.

Example 6

The palm super stearin with IV 12 (manufactured by MEWAHOLEO INDUSTRIES SDN. BHD.) was completely melted at 70° C., and then water temperature was gradually cooled to 60° C. When the slurry SFC became 0.5%, the slurry was transported to the laboratory filter, and was filtered. By pressurizing up to 6 bar, hard part shown in Table 1 was obtained. The resultant hard part was categorized into the palm-based fractionated oil and fat of the present invention. Similarly to Example 1, the hard part yield, the fractionation efficiency and composition of the hard part were measured. The results are shown in Table 2.

Example 7

The palm super stearin with IV 12 (manufactured by MEWAHOLEO INDUSTRIES SDN. BHD.) was completely melted at 70° C., and then water temperature was gradually cooled to 60° C. When the slurry SFC became 0.7%, the slurry was transported to the laboratory filter, and was filtered. By pressurizing up to 15 bar, hard part shown in Table 2 was obtained. The resultant hard part was categorized into the palm-based fractionated oil and fat of the present invention. Similarly to Example 1, the hard part yield, the fractionation efficiency and composition of the hard part were measured. The results are shown in Table 2.

Example 8

After mixing 6 parts of n-hexane with 1 part of the palm super stearin with IV 12 (manufactured by MEWAHOLEO INDUSTRIES SDN. BHD.), the resultant mixture was completely melted at 45° C. By cooling to 28° C., solvent fractionation was performed. The slurry SFC was 0.8% by weight. After performing separation by filtration, the solvent was collected by distillation. The hard part with yield of 1.5% by weight was obtained. Similarly to Example 1, the hard part yield, the fractionation efficiency and composition of the hard part were measured. The results are shown in Table 2.

Example 9

After mixing 6 parts of n-hexane with 1 part of the palm super stearin with IV 11 (manufactured by FELDA IFFCO OIL PRODUCTS SDN. BHD.), the resultant mixture was completely melted at 45° C. By cooling to 28° C., solvent fractionation was performed. The slurry SFC was 3.2% by weight. After performing separation by filtration, the solvent was collected by distillation. The hard part with yield of 4.5% by weight was obtained. Similarly to Example 1, the hard part yield, the fractionation efficiency and composition of the hard part were measured. The results are shown in Table 2.

Example 10

After mixing 9 parts of acetone with 1 part of the palm super stearin with IV 12 (manufactured by MEWAHOLEO INDUSTRIES SDN. BHD.), the resultant mixture was completely melted at 50° C. By cooling to 32° C., solvent fractionation was performed. The slurry SFC was 2.5% by weight. After performing separation by filtration, the solvent was collected by distillation. The hard part with yield of 3.6% by weight was obtained. Similarly to Example 1, the hard part yield, the fractionation efficiency and composition of the hard part were measured. The results are shown in Table 2.

Example 11

After mixing 4 parts of n-hexane with 1 part of the palm super stearin with IV 12 (manufactured by MEWAHOLEO INDUSTRIES SDN. BHD.), the resultant mixture was completely melted at 50° C. By cooling to 28° C., solvent fractionation was performed. The slurry SFC was 18% by weight. After performing separation by filtration, the solvent was collected by distillation. The hard part with yield of 25% by weight was obtained. Similarly to Example 1, the hard part yield, the fractionation efficiency and composition of the hard part were measured. The results are shown in Table 2.

Comparative Example 1

The palm super stearin with IV 12 (manufactured by MEWAHOLEO INDUSTRIES SDN. BHD.) was completely melted at 70° C., and then water temperature was gradually cooled to 59° C. When the slurry SFC became 1.0%, the slurry was transported to the laboratory filter, and was filtered. By pressurizing up to 4 bar, hard part shown in Table 2 was obtained. Similarly to Example 1, the hard part yield, the fractionation efficiency and composition of the hard part were measured. The results are shown in Table 2.

Comparative Example 2

The palm super stearin with IV 32 (manufactured by J-OIL MILLS, Inc.) was completely melted at 70° C., and then water temperature was gradually cooled to 53° C. When the slurry SFC became 0.4%, the slurry was transported to the laboratory filter, and was filtered. By pressurizing up to 15 bar, hard part was obtained. Similarly to Example 1, the hard part yield, the fractionation efficiency and composition of the hard part were measured. The results are shown in Table 2.

Comparative Example 3

For comparative purposes, extremely hardened palm oil (manufactured by Yokozeki Oil & Fat Industries Co., Ltd.) was prepared. The tripalmitin content, the unsaturated fatty acid content, the triglyceride containing unsaturated fatty acid content, and the tripalmitin content to tri-saturated fatty acid triglyceride thereof are shown in Table 2.

TABLE 2

| | | Fractionation operation | | | Composition of palm-based fractionated oil and fat(fractionated hard part) | | | |
|---|---|---|---|---|---|---|---|---|
| | Raw material | Slurry SFC[1] (wt %) | Hard part yield[2] (wt %) | Fractionation efficiency[3] | Tripalmitin content[4] (wt %) | Unsaturated fatty acid content[5] (wt %) | Unsaturated fatty acid-containing Triglyceride content[6] (wt %) | Tripalmitin content in tri-saturated fatty acid triglyceride[7] (wt %) |
| Example 1 | Palm super stearin (IV12) | 0.7 | 2.5 | 3.5 | 84.6 | 2.7 | 4.4 | 88.5 |
| Example 2 | Palm super stearin (IV12) | 2 | 14.2 | 7.1 | 81.5 | 5.8 | 7.9 | 88.5 |
| Example 3 | Palm super stearin (IV15) | 1.7 | 12.4 | 7.5 | 72 | 7.7 | 15.3 | 85.0 |
| Example 4 | Palm super stearin (IV15) | 0.2 | 1.4 | 6.7 | 71.7 | 7.2 | 15.1 | 84.5 |
| Example 5 | Palm super stearin (IV12) | 0.4 | 2.4 | 6.7 | 79.9 | 5.9 | 8.5 | 87.3 |
| Example 6 | Palm super stearin (IV12) | 0.5 | 5 | 9.4 | 83 | 5.7 | 6.6 | 88.9 |
| Example 7 | Palm super stearin (IV12) | 0.7 | 3 | 4.3 | 84.2 | 3.4 | 5.7 | 89.3 |

TABLE 2-continued

| | | Fractionation operation | | | Composition of palm-based fractionated oil and fat(fractionated hard part) | | | |
|---|---|---|---|---|---|---|---|---|
| | Raw material | Slurry SFC[1] (wt %) | Hard part yield[2] (wt %) | Fractionation efficiency[3] | Tripalmitin content[4] (wt %) | Unsaturated fatty acid content[5] (wt %) | Unsaturated fatty acid-containing Triglyceride content[6] (wt %) | Tripalmitin content in tri-saturated fatty acid triglyceride[7] (wt %) |
| Example 8 | Palm super stearin (IV12) | 0.8 | 1.5 | 1.9 | 85.3 | 1.8 | 2.8 | 87.8 |
| Example 9 | Palm super stearin (IV11) | 3.2 | 4.5 | 1.5 | 84.8 | 1.7 | 2.9 | 87.3 |
| Example 10 | Palm super stearin (IV12) | 2.5 | 3.6 | 1.4 | 83.4 | 1.8 | 3.0 | 86.0 |
| Example 11 | Palm super stearin (IV12) | 18 | 25 | 1.4 | 84.7 | 1.6 | 2.8 | 87.1 |
| Comparative example 1 | Palm super stearin (IV12) | 1 | 16 | 16 | 73.8 | 8.5 | 14.4 | 86.2 |
| Comparative example 2 | Palm super stearin (IV32) | 0.4 | 2.1 | 5.7 | 68 | 11.6 | 19.9 | 84.9 |
| Comparative example 3 | Extremely hardened palm oil | — | — | — | 9.9 | 0.1 | 0.3 | 9.9 |

[1] Slurry SFC = solid fat weight/slurry oil and fat weight * 100 (% by weight)
[2] Hard part yield = hard part weight/(hard part weight + liquid part weight) * 100 (% by weight)
[3] Fractionation efficiency = hard part yield/slurry SFC
[4] Tripalmitin content = tripalmitin weight/triglyceride weight * 100 (% by weight)
[5] Unsaturated fatty acid content = unsaturated fatty acid (18:1 + 18:2 + 18:3) weight/total fatty acid weight * 100 (% by weight)
[6] Triglyceride containing unsaturated fatty acid content = triglyceride containing unsaturated fatty acid weight/triglyceride weight * 100 (% by weight)
[7] Tripalmitin content to tri-saturated fatty acid triglyceride = tripalmitin weight/tri-saturated fatty acid triglyceride weight * 100 (% by weight)

Examples 12-24 and Comparative Examples 4-10

Preparation of the Oil and Fat Composition

The crystallization-promoting effect of the oil and fat composition containing the palm-based fractionated oil and fat of the present invention was examined. Specifically, by adding the palm-based fractionated oil and fat shown in Table 3 to palm oil with IV 52 as a base oil component (hereinafter, referred to as "oil and fat A"), the oil and fat composition with crystallization-promoting was prepared.

SFC of 25° C.*20 minutes of the obtained oil and fat composition was measured by the following method. After completely fusing the oil and fat composition at 80° C., 2 mL of the resultant oil and fat composition was put in a glass vessel. Then, after fusing completely at 100° C., the resultant composition was placed in a constant temperature water bath at 60° C. for 60 minutes. Furthermore, after placing in a constant temperature water bath at 25° C. for 20 minutes. The amount of precipitated crystal was measured by NMR analyzer (NMS 120 minispec, BRUKER Corp.). The results are shown in Table 3.

For comparative purposes, without the addition of the palm-based fractionated oil and fat of the present invention, or instead of the palm-based fractionated oil and fat of the present invention, with the addition of extremely hydrogenated rapeseed oil (manufactured by Yokozeki Oil & Fat Industries Co., Ltd.), extremely hydrogenated high erucic rapeseed oil (manufactured by Yokozeki Oil & Fat Industries Co., Ltd.), extremely hydrogenated palm oil (manufactured by Yokozeki Oil & Fat Industries Co., Ltd.) or tripalmitin (manufactured by Wako Pure Chemical Industries, Ltd.), the oil and fat A was tested by the same method as described above. The results are shown in Table 3.

TABLE 3

| | Composition of oil and fat composition | | | | SFC[2] of oil and fat composition |
|---|---|---|---|---|---|
| | Base oil and fat | Rate (%) | Crystallization-promoting oil and fat | Rate (%) | |
| Example 12 | Oil and fat A[1] | 99 | Palm-based fractionated oil and fat obtained in Example 1 | 1 | 9.9 |
| Example 13 | Oil and fat A | 99 | Palm-based fractionated oil and fat obtained in Example 2 | 1 | 4.2 |
| Example 14 | Oil and fat A | 99 | Palm-based fractionated oil and fat obtained in Example 3 | 1 | 4.6 |
| Example 15 | Oil and fat A | 99 | Palm-based fractionated oil and fat obtained in Example 4 | 1 | 6.9 |

TABLE 3-continued

| | Composition of oil and fat composition | | | | SFC[2] of oil and fat composition |
|---|---|---|---|---|---|
| | Base oil and fat | Rate (%) | Crystallization-promoting oil and fat | Rate (%) | |
| Example 16 | Oil and fat A | 99 | Palm-based fractionated oil and fat obtained in Example 5 | 1 | 5.9 |
| Example 17 | Oil and fat A | 99 | Palm-based fractionated oil and fat obtained in Example 6 | 1 | 6.9 |
| Example 18 | Oil and fat A | 99 | Palm-based fractionated oil and fat obtained in Example 7 | 1 | 7.2 |
| Example 19 | Oil and fat A | 99.5 | Palm-based fractionated oil and fat obtained in Example 1 | 0.5 | 5 |
| Example 20 | Oil and fat A | 99.7 | Palm-based fractionated oil and fat obtained in Example 1 | 0.3 | 4.1 |
| Example 21 | Oil and fat A | 99 | Palm-based fractionated oil obtained in Example 8 | 1 | 7.5 |
| Example 22 | Oil and fat A | 99 | Palm-based fractionated oil obtained in Example 9 | 1 | 7.8 |
| Example 23 | Oil and fat A | 99 | Palm-based fractionated oil obtained in Example 10 | 1 | 7.1 |
| Example 24 | Oil and fat A | 99 | Palm-based fractionated oil obtained in Example 11 | 1 | 4.2 |
| Comparative Example 4 | Oil and fat A | 99 | Palm-based fractionated oil and fat obtained in Comparative Example 1 | 1 | 3.5 |
| Comparative Example 5 | Oil and fat A | 99 | Palm-based fractionated oil and fat obtained in Comparative Example 2 | 1 | 2.2 |
| Comparative Example 6 | Oil and fat A | 100 | — | — | 0.7 |
| Comparative Example 7 | Oil and fat A | 99 | Extremely hydrogenated rapeseed oil | 1 | 3.9 |
| Comparative Example 8 | Oil and fat A | 99 | Extremely hydrogenated high erucic rapeseed oil | 1 | 3.9 |
| Comparative Example 9 | Oil and fat A | 99 | Extremely hydrogenated palm oil | 1 | 2.8 |
| Comparative Example 10 | Oil and fat A | 99 | Tripalmitin | 1 | 1.6 |

[1])Oil and fat A: Palm oil with IV 52
[2])SFC: Solid content of 25° C.*20 minutes after FIG. 1 shows behavior of SFC of 20° C.*placed 4-20 minutes of Example 12 (oil and fat composition with the addition of the palm-based fractionated oil and fat obtained in Example 1), Comparative Example 6 (additive-free), Comparative Example 7 (with the addition of extremely hydrogenated rapeseed oil) and Comparative Example 10 (with the addition of tripalmitin). FIG. 1 indicates that, though SFC of the oil and fat composition with the addition of the palm-based fractionated oil and fat of the present invention (the blended composition of the palm-based oil and the palm oil (IV 52)) is the same as others from 0 minute to around 4 minutes, after that, it increases more rapidly than the others. Therefore, the oil and fat composition of the present invention is superior to the others in terms of operability such that in an early stage of manufacturing process work time is reserved and that crystallization is early performed.

Examples 25-28 and Comparative Examples 11-14

Production of the Oil and Fat Composition for Doughnuts Frying Oil

Influence of the crystallization-promoting effect of the oil and fat composition of the present invention on heating was examined. Specifically, to base oil and fat containing palm oil (IV 52) and palm olein (IV 56) on a weight basis at 70:30 (hereinafter, referred to as "oil and fat B") and base oil containing palm stearin (IV32), palm oil (IV52) and rapeseed oil on a weight basis at 20:40:40 (hereinafter, referred to as "oil and fat C"), the palm-based fractionated oil and fat of the present invention was added in the proportions shown in Table 4. 250 grams of the obtained oil and fat composition was put in a porcelain dish, and heated to 190° C.

The oil and fat composition was sampled before heating, 24 hours after heating and 48 hours after heating, and SFC of 25° C. 20 minutes after was measured. The results are shown in Table 4.

For comparative purposes, instead of the palm-based fractionated oil and fat of the present invention, the oil and fat composition, which is oil and fat B with the addition of two types of emulsifiers shown in Table 4, was tested by the same method as described above. The results are shown in Table 4.

TABLE 4

| | | Composition of oil and fat composition | | | | SFC[3] of oil and fat composition | | | |
|---|---|---|---|---|---|---|---|---|---|
| | | Base oil and fat | Rate (%) | Crystallization-promoting oil and fat/emulsifier | Rate (%) | Before heating | 24 hours after heating | 48 hours after heating | Decrement of SFC(%)[6] |
| Example 25 | | Oil and fat B[1] | 99.0 | Palm-based fractionated oil and fat obtained in Example 1 | 1.0 | 8.4 | 8.8 | 8.0 | 4.8 |

TABLE 4-continued

|  | Composition of oil and fat composition |  |  |  | SFC[3] of oil and fat composition |  |  |  |
|---|---|---|---|---|---|---|---|---|
|  | Base oil and fat | Rate (%) | Crystallization-promoting oil and fat/emulsifier | Rate (%) | Before heating | 24 hours after heating | 48 hours after heating | Decrement of SFC(%)[6] |
| Example 26 | Oil and fat B | 99.0 | Palm-based fractionated oil and fat obtained in Example 7 | 1.0 | 8.1 | 8.9 | 8.2 | −1.2 |
| Example 27 | Oil and fat C[2] | 99.0 | Palm-based fractionated oil and fat obtained in Example 1 | 1.0 | 12.9 | 13.1 | 12.1 | 6.2 |
| Example 28 | Oil and fat C | 99.0 | Palm-based fractionated oil and fat obtained in Example 7 | 1.0 | 12.9 | 12.8 | 12.7 | 1.6 |
| Comparative Example 11 | Oil and fat B | 99.0 | Poem J-46B[4] | 1.0 | 8.3 | 6.1 | 1.3 | 84.3 |
| Comparative Example 12 | Oil and fat B | 99.0 | SUNFAT PS-68[5] | 1.0 | 4.2 | 1.8 | 1.6 | 61.9 |
| Comparative Example 13 | Oil and fat B | 99.0 | Palm-based fractionated oil and fat obtained in Comparative Example 2 | 1.0 | 2.4 | 2.5 | 2.3 | 4.2 |
| Comparative Example 14 | Oil and fat C | 100.0 | — | — | 8.8 | 6.4 | 4.9 | 44.3 |

[1] Oil and fat B: Blended oil containing palm oil (IV 52):palm olein (IV 56) = 70:30
[2] Oil and fat C: Blended oil containing palm stearin (IV32):palm oil (IV52):rapeseed oil = 20:40:40
[3] SFC: Solid content of 25° C.*20 minutes after
[4] Poem J-46B: Tetraglycerol hexabehenate (manufactured by Riken Vitamin Co., Ltd.)
[5] SUNFAT PS-68: Hexaglycerol octastearate (manufactured by Taiyo Kagaku Co., Ltd.)
[6] Decrement of SFC: (SFC before heating-SFC 48 hours after heating)/SFC before heating * 100

As shown in Table 4, when the oil and fat composition of the present invention is heated to frying condition, the promoted crystallization is not reduced. While, in the emulsifier known to have crystallization-promoting effect, its effect is extremely reduced by heating, the palm-based fractionated oil and fat and the oil and fat composition of the present invention shows superiority.

Examples 29-30 and Comparative Examples 15-17

Production of the Oil and Fat Composition for Shortening

Using the oil and fat composition containing the palm-based fractionated oil and fat of the present invention, oil and fat composition for shortening was produced. Specifically, to base oil consisting of oil and fat hydrogenated after transesterification of palm oil and palm kernel oil (weight ratio 4:6):palm olein (IV56):soybean oil=20:60:20 (hereinafter, referred to as "oil and fat D"), the palm-based fractionated oil and fat of the present invention was added in the proportions shown in Table 5.

Physical properties of the obtained shortening were evaluated. At first, SFC after 25° C.*20 minutes of the shortening was evaluated. The results are shown in Table 5.

Then, a filling condition of the shortening was evaluated according to the following criterion:
○ Good
Δ Slightly soft or Slightly hard
X Soft or Hard.
The results are shown in Table 4.

Then, hardness of the shortening was measured with a rheometer (FUDOH rheometer manufactured by Rheotech Co., Ltd.). The hardness is expressed as stress value when a cylindrical probe having a diameter of 15 mm is pushed into the product to a depth of 10 mm at a speed of 60 mm/min. The results are shown in Table 5.

For comparative purposes, instead of the palm-based fractionated oil and fat of the present invention, the oil and fat composition with the addition of three kinds of emulsifier shown in Table 4 was tested by the same method as described above. The results are shown in Table 5.

TABLE 5

|  | Composition of oil and fat composition |  |  |  | Physical property of oil and fat composition |  |  |
|---|---|---|---|---|---|---|---|
|  | Base oil and fat | Rate (%) | Crystallization-promoting oil and fat/emulsifier | Rate (%) | SFC[2] | Hardness[3] | Filling condition |
| Example 29 | Oil and fat D[1] | 99.0 | Palm-based fractionated oil and fat obtained in Example 1 | 1.0 | 17.6 | 23.6 | ○ |
| Example 30 | Oil and fat D | 99.0 | Palm-based fractionated oil and fat obtained in Example 5 | 1.0 | 17.8 | 25.7 | ○ |
| Comparative Example 15 | Oil and fat D | 100 | — | — | 14.5 | 10.7 | x |

TABLE 5-continued

|  | Composition of oil and fat composition | | | Physical property of oil and fat composition | | |
| --- | --- | --- | --- | --- | --- | --- |
|  | Base oil and fat | Rate (%) | Crystallization-promoting oil and fat/emulsifier | Rate (%) | SFC[2] | Hardness[3] | Filling condition |
| Comparative Example 16 | Oil and fat D | 99.0 | Poem J-46B | 1.0 | 14.9 | 15.0 | Δ |
| Comparative Example 17 | Oil and fat D | 99.0 | Extremely hydrogenated palm oil | 1.0 | 14.3 | 59.9 | Δ |

[1] Oil and fat D: Blended oil containing oil and fat hardened after transesterification of palm oil and palm kernel oil (4:6):palm olein (IV56):soybean oil = 20:60:20
[2] SFC: Solid fat content after 25° C.*20 minutes
[3] Hardness: Stress value when a cylindrical probe having a diameter of 15 mm is pushed into the product to a depth of 10 mm at a speed of 60 mm/min, by FUDOH rheometer As shown in Table 5, the example shortening using the palm-based fractionated oil and fat of the present invention improves filling condition by promoting crystallization.

Example 31 and Comparative Examples 18-21
Production of the Chocolate A

Using the oil and fat composition containing the palm-based fractionated oil and fat of the present invention, chocolate was produced. At first, chocolate base paste A having the composition shown in Table 6 was made in the following method. Total amount of the cocoa powder, the sugar and the milk sugar, 23% of the oil and fat E, and 0.125% of the lecithin were stirred to a paste for around 20 minutes at 45-55° C. in a warm mixer. After crushing (refining) by three roll mills, to the refined composition, 5% of the oil and fat E and 0.125% of the lecithin were added, and then the mixture was submitted to a stirring and conching step for around 3 hours at 45-55° C. Furthermore, 7% of the residue oil and fat and 0.25% of the lecithin were added, then, by stirring for around 30 minutes at 45-55° C., the chocolate base paste A was obtained.

TABLE 6

| Raw material composition | Rate |
| --- | --- |
| Oil and fat E[1] | 35.00% |
| Cocoa powder | 17.50% |
| Sugar | 33.00% |
| Lactose | 8.95% |
| Lecithin | 0.50% |
| Lignin Vanillin | 0.05% |
| Total | 95.00% |

[1] Oil and fat E: Blended oil containing extremely hydrogenated palm kernel oil:palm kernel olein = 70:30

After blending 4% of the oil and fat E and 1% of the palm-based fractionated oil and fat obtained in Example 1, to the resultant composition, 95% of the chocolate base paste A obtained by the above mentioned method was added. Then, after heating to 80° C., the composition was well stirred. 2 g of the resultant chocolate A in the melting state was dropped onto a stainless bat.

After holding at 40° C. for 10 minutes, the stainless bat was placed vertically at room temperature of 20° C. Then, drapability and solidification of the chocolate were observed. Table 7 shows the drapability of chocolate by drip length, and the solidification by length of time until the chocolate becomes non-stuck state when touched.

Also, based on the results, comprehensive evaluation was carried out according to the following criterion.

○ Initial viscosity is low (Drip length is long enough), and solidifying is faster than additive-free Δ Initial viscosity is not high (Drip length is long), and solidifying is slightly faster than additive-free X Initial viscosity is high (Drip length is short) or initial viscosity is not high (Drip length is long), and solidifying speed is the same as additive-free or slower than additive-free The results are shown in Table 7.

For comparative purposes, instead of the palm-based fractionated oil and fat of the present invention, using emulsifiers shown in Table 7, the same test as described above was carried out. The results are shown in Table 7.

TABLE 7

|  | Composition of Chocolate A | | | | | | Evaluation | | |
| --- | --- | --- | --- | --- | --- | --- | --- | --- | --- |
|  | Base paste | Rate (%) | Oil and fat | Rate (%) | Crystallization-promoting oil and fat/emulsifier | Rate (%) | Solidifying time | Drip length (cm) | Comprehensive evaluation |
| Example 31 | Chocolate base paste A | 95 | Oil and fat E[1] | 4 | Palm-based fractionated oil and fat obtained in Example 1 | 1 | 4 min 40 sec | 20 | ○ |
| Comparative Example 18 |  |  |  | 4 | Poem J-46B | 1 | 5 min 00 sec | 15 | x |
| Comparative Example 19 |  |  |  | 4 | Poem S-65V | 1 | 6 min 00 sec | 23 | x |

TABLE 7-continued

| | Composition of Chocolate A | | | | | | Evaluation | | |
|---|---|---|---|---|---|---|---|---|---|
| | Base paste | Rate (%) | Oil and fat | Rate (%) | Crystallization-promoting oil and fat/emulsifier | Rate (%) | Solidifying time | Drip length (cm) | Comprehensive evaluation |
| Comparative Example 20 | | | | 4 | Extremely hardened palm oil | 1 | 5 min 15 sec | 23 | Δ |
| Comparative Example 21 | | | | 5 | — | — | 5 min 50 sec | 22 | x |

[1] Oil and fat E: Blended oil containing extremely hydrogenated palm kernel oil:palm kernel olein = 70:30

As shown in Table 7, the chocolate A obtained by using the palm-based fractionated oil and fat of the present invention has a moderate drip length (initial viscosity does not increase rapidly), short solidifying time, and the best comprehensive evaluation result.

Example 32 and Comparative Example 22

Production of the Chocolate B

Using the oil and fat composition containing the palm-based fractionated oil and fat of the present invention, chocolate was produced, and the texture and the melt-in-the-mouth feeling were evaluated. At first, the raw materials shown in Table 8 were stirred to a paste for around 20 minutes at 45-55° C. in a warm mixer. After crushing (refining) by three roll mills, the refined composition was submitted to a stirring and conching step for around 3 hours at 45-55° C. The chocolate base paste B was obtained.

TABLE 8

| Raw material composition | Rate |
|---|---|
| Oil and fat F[1] | 17.00% |
| Cacao mass | 12.00% |
| Whole milk powder | 17.00% |
| Skim milk powder | 14.00% |
| Sugar | 29.45% |
| Lecithin | 0.50% |
| Lignin Vanillin | 0.05% |
| Total | 90.00% |

[1] Oil and fat F: Hard PMF (manufactured by J-OIL MILLS, Inc.)

In Example 32, after blending and fusing the oil and fat F and the palm-based fractionated oil and fat obtained in Example 9 in the proportions shown in Table 9, to the resultant composition, the chocolate base paste B was added in the proportion shown in Table 9. Then, the composition was stirred uniformly at about 45° C. The temperature of the resultant melted paste was cooled to 30° C., and then, 0.2% by weight of a temper seed (trade name for Quick Temper, manufactured by Nisshin kakou Co., Ltd.) was added to the paste to temper.

The tempered paste was poured into a mold and degassed by tapping. By keeping at about 10° C. for 15 minutes, the paste was cooled to solidify. The solidified chocolate was ejected from the mold, then, after aging in an incubator at 20° C. for ten days, melt-in-the-mouth feeling and snap property were evaluated according to the following criterion. The results are shown in Table 9.

Melt-in-the-Mouth Feeling Evaluation
◎ Very good in melt-in-the-mouth feeling
○ Good in melt-in-the-mouth feeling
Δ Normal melt-in-the-mouth feeling
X Poor in melt-in-the-mouth feeling Snap Property Evaluation
◎ Very good snap property
○ Good snap property
Δ Normal snap property
X No snap property In Comparative Example 22, except blending the melted oil and fat F and the melted chocolate base paste B in the proportions shown in Table 9, the same operations as Example 32 were performed. Then, the same organoleptic tests as Example 32 were carried out. The results are shown in Table 9.

TABLE 9

| | Composition of Chocolate B | | | | | | Evaluation | |
|---|---|---|---|---|---|---|---|---|
| | Chocolate base paste | Rate (%) | Oil and Fat | Rate (%) | Crystallization promoting oil and fat | Rate (%) | Snap property | Melt-in-the-mouth feeling |
| Example 32 | Chocolate base paste B | 90 | Oil and Fat F[1] | 9.6 | Palm-based fractionated oil and fat obtained in Example 9 | 0.4 | ◎ | ◎ |
| Comparative example 22 | | | | 10 | — | — | Δ | ○ |

Oil and fat F: Hard PMF (manufactured by J-OIL MILLS, Inc.)

As shown in Table 9, the chocolate B made by using the palm-based fractionated oil and fat of the present invention has superior snap property and melt-in-the-mouth feeling.

What is claimed:

1. A palm-based fractionated oil and fat, wherein the tripalmitin content to triglyceride is 70%-90 by weight, the unsaturated fatty acid content to total fatty acid is 1-8% by weight and the tripalmitin content to tri-saturated fatty acid triglyceride is 84-95% by weight, wherein the palm-based fractionated oil and fat further consist of a hard part obtained by performing a crystallization operation of a palm fractionated hard part to obtain a slurry and fractionating the slurry so that the hard part yield is 26% by weight or less, the palm fractionated hard part is palm super stearin with iodine value 10-17, and wherein the crystallization operation of the fractionation is performed so that the slurry SFC is 10% by weight or less.

* * * * *